United States Patent

Guha

[11] 3,973,777
[45] Aug. 10, 1976

[54] CUEING CONTROL
[75] Inventor: Dwipendra Nath Guha, Suffolk County, N.Y.
[73] Assignee: Avnet, Inc., New York, N.Y.
[22] Filed: Dec. 30, 1974
[21] Appl. No.: 537,565

[52] U.S. Cl. .............................................. 274/23 R
[51] Int. Cl.² ............................................... G11B 3/10
[58] Field of Search ....................... 274/10 R, 23 R

[56] References Cited
UNITED STATES PATENTS

| | | | |
|---|---|---|---|
| 3,388,912 | 6/1968 | Shimoda et al. | 274/23 R |
| 3,534,967 | 10/1970 | Freier | 274/10 R |
| 3,717,350 | 2/1973 | Oakley et al. | 274/23 R |
| 3,727,922 | 4/1973 | Igata | 274/23 R X |
| 3,761,098 | 9/1973 | Nishiwaki et al. | 274/23 R |

Primary Examiner—Charles E. Phillips
Attorney, Agent, or Firm—Richard P. Crowley

[57] ABSTRACT

The present invention provides, in a record player, a cueing control means embodying a hydraulic control member which utilizes the viscosity of a fluid of high internal friction and which provides for a substantially uniform rate of withdrawal of the needle from the groove and a uniform rate of return of the needle to the groove. The rate of movement may be adjusted but preferably remains the same within the cycle of withdrawal of the needle and its return to the groove. This substantially obviates change in tone or pitch which will occur if the rate of withdrawal differs from the rate of needle reentry into the groove. The hydraulic fluid employed in the preferred embodiment of the invention is one or more discrete bodies of silicone grease, or its equivalent. This material is stable under a wide range of conditions of temperature and pressure. It is cohesive and is inert to metals with which it is in contact. It has a high surface tension and a high viscosity and even though exposed to the atmosphere retains the aforesaid characteristics without deterioration over long periods of time. Thereby the rate of withdrawal of the needle from the groove and the rate of restoration of the same to the groove are maintained substantially uniform, and the introduction of a change in tone due to variation in the rate of movements involved in the cueing operation is avoided. The mechanism involves a brake to hold the needle in fixed radial (groove) position from the initiation of the cueing operation to the termination thereof. The timing of the movement of the brake to hold radial position of the needle and lifting pin is critical to the proper performance of the cueing means and the playing of the record. The brake applies a small frictional drag to the tone arm to stop it from moving laterally just prior to the needle starting to come out of the groove. When cueing the arm manually, or in an automatic mode, the needle should always be returned to the same passage of the record where cueing was begun. The brake is timed to be applied just before the tone arm lifts the needle off of the record and remains on during the cueing operation. The applied brake force results in lateral frictional resistance that exceeds the antiskate force of the needle in the groove. The timing control is inherently good in the present disclosure seeing that the lift and brake actions stem from the same rocker plate.

2 Claims, 5 Drawing Figures

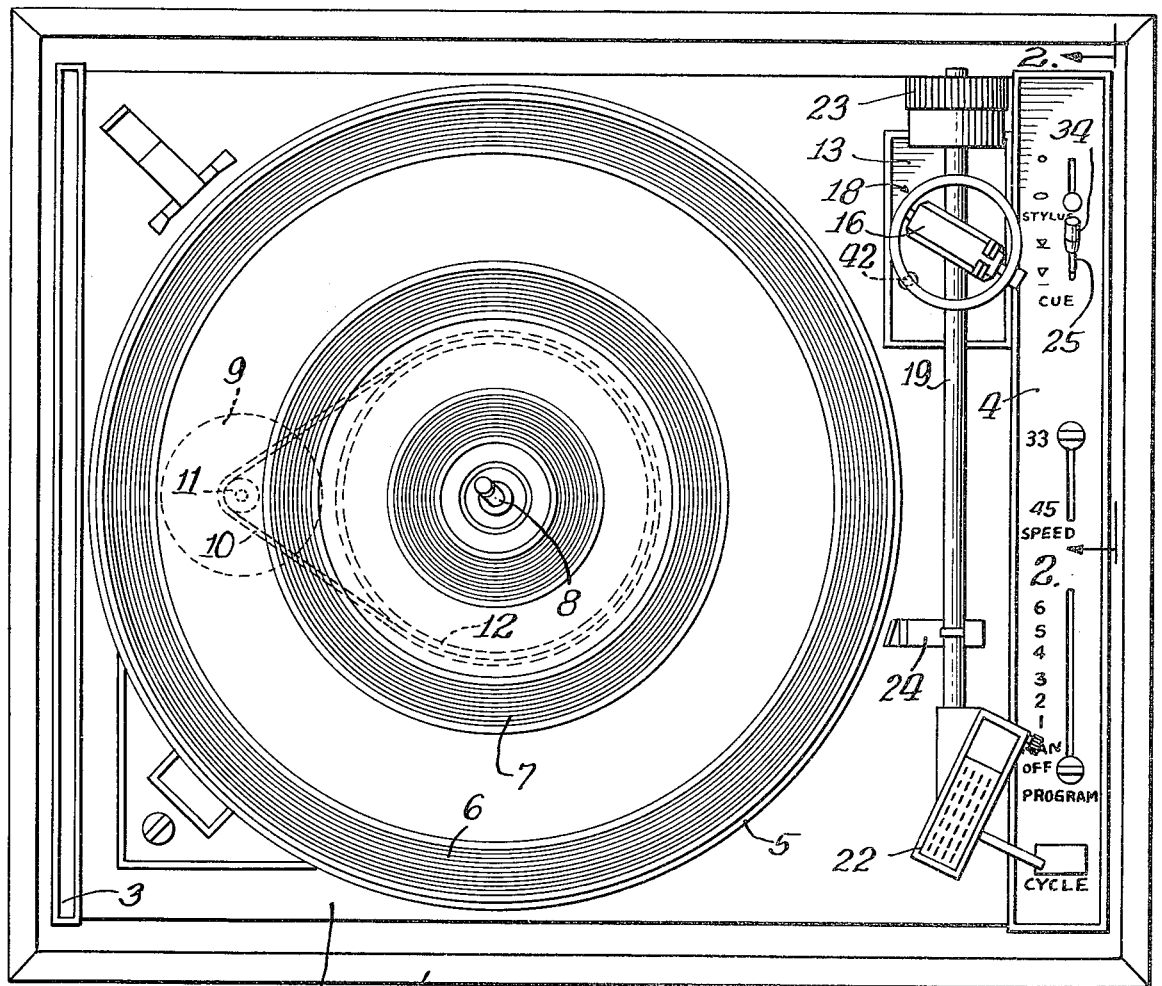
Fig. 1.
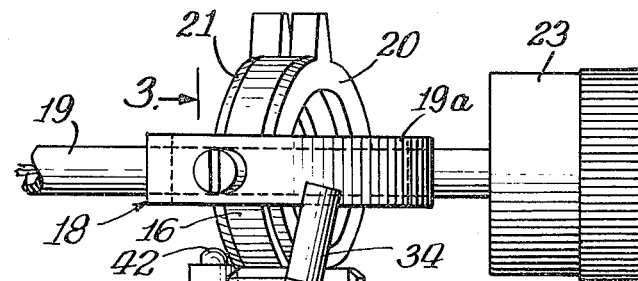
Fig. 2.
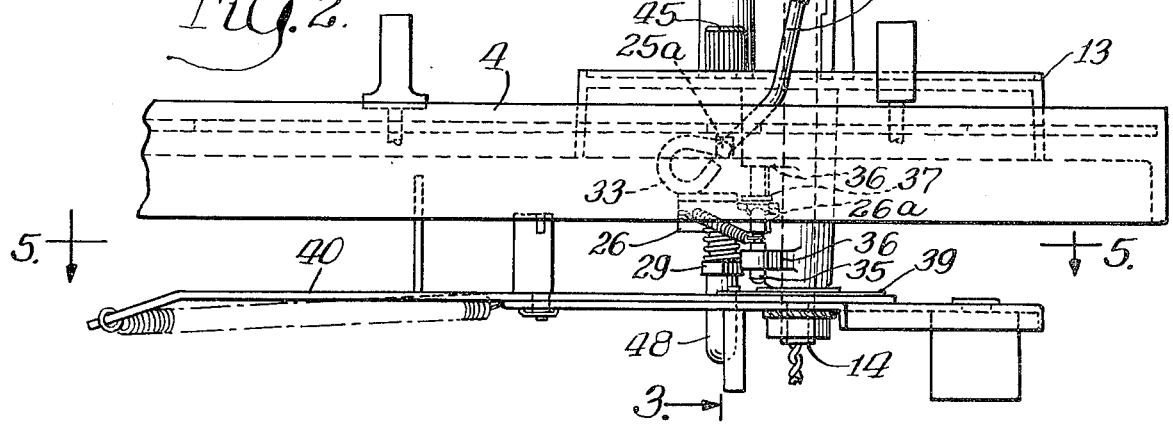

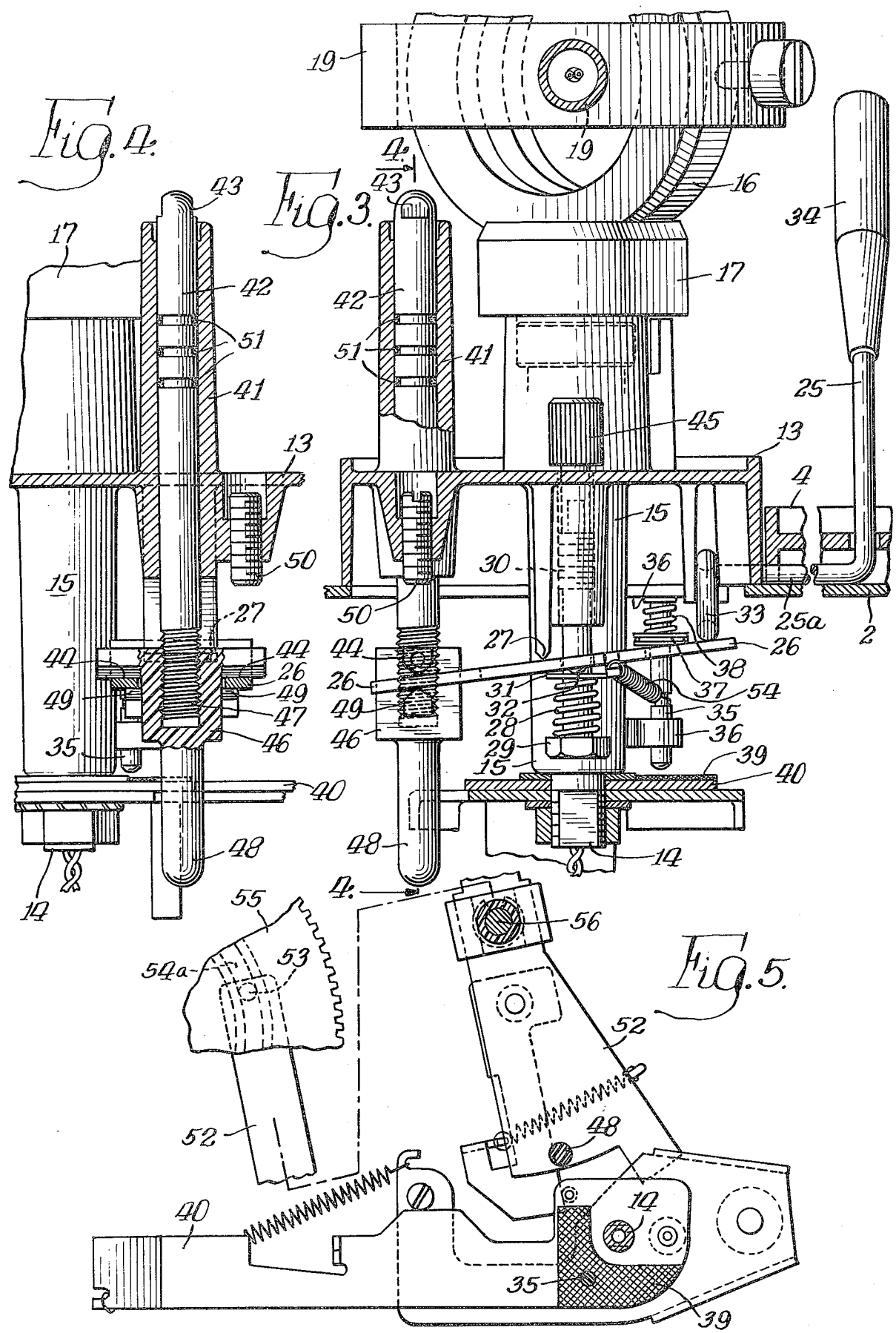

CUEING CONTROL

CROSS REFERENCE TO RELATED APPLICATIONS

Reference is here made to my prior application entitled "Record Player Needle Control Mechanism", Ser. No. 516,798, filed Oct. 21, 1974, in which an earlier form of cueing control is illustrated and described. My prior application entitled "Programmer for Record Player", Ser. No. 477,171, filed June 6, 1974, discloses and claims a record player having certain similar operating parts.

BACKGROUND OF THE INVENTION

The interruption of playing of a record for the introduction of nonrecorded material (i.e., extraneous of the record) into the overall program, or for other purposes, is known. Manual manipulation of such interruption of playing and resumption of playing of a record is likely to result in noise, change in pitch, and/or a disjointed program. The aim of the present invention is to avoid the uncertainties of purely manual unguided manipulation of the parts of the player affected by a cueing operation, by providing a hydraulic control of the special character herein disclosed for the operations of lifting the needle out of the groove, holding the registration of the needle with that part of the groove from which it has been raised, and then later restoring the needle to the groove from which it was lifted with minimum disjointing of the interrupted playing of the record. Thereby material inserted into the program may have continuity with the remaining part of the program with results superior to the unregulated operation of known forms of cueing equipment. While the invention is disclosed in an embodiment that involves a gimbal ring mounting of the tone arm, certain features of the same are applicable to other types of players.

SUMMARY OF THE INVENTION

In accordance with the present invention, a hydraulic governor operating on the availability of stable internal viscosity of a suitable heavy liquid or grease, such as silicone or Anderol, assures a controlled rate of motion for the needle in its exit from the groove and later in its return into the groove to resume playout. This minimizes changes in pitch and promotes continuity.

The lifting of the needle out of the groove is effected by a cam, shifted by the hand of the operator, said cam being self-locking, i.e., the angle of rise is below the coefficient of friction, so that the cam may not back away if pressure on the finger piece is released. The same is true of the lowering of the needle by the cam. The needle will not run ahead of the cam as the cam is self-locking. The degree of self-locking is such that it may readily be overcome by the hand of the operator to release control to the hydraulic controller.

Simultaneously, with lifting the needle or, preferably, immediately prior thereto, the governing mechanism applies a brake to the tone arm so that upon termination of the cueing period and lowering of the needle, the needle may find its way back into substantially the same location in the record groove from which it was lifted and resume its progress in the groove. The basic control of rate of motion of the needle in and out of the groove is governed by the hydraulic governor element which, in the preferred form, is nonadjustable as to its allowed rate of movement. Initiation of the operation of applying the brake to the tone arm and lifting the needle out of the groove and the operation of releasing the brake and restoring the needle to the groove are within the control of the operator. The rate of performance of these operations is governed by the setting of the time control elements. The cylinder in which the plunger of the hydraulic governor moves preferably exceeds in length the stroke of the plunger to the end that the silicone filled grooves are not uncovered but are always covered or closed and consequently the resistance of the plunger to movement in the cylinder arises from the internal resistance to flow of the annular or toroidal bodies of grease produced by endwise displacement of the plunger relative to the cylinder. This remains the same indefinitely.

BRIEF DESCRIPTION OF THE FIGURES OF THE DRAWINGS

FIG. 1 is a plan view of a record player equipped with the cue rate control of my present invention;

FIG. 2 is a fragmentary elevational view taken on the line 2—2 of FIG. 1 looking in the direction of the arrows;

FIG. 3 is a vertical sectional view taken on the line 3—3 of FIG. 2 looking in the direction of the arrows;

FIG. 4 is a vertical section through the hydraulic cylinder taken on the line 4—4 of FIG. 3 looking in the direction of the arrows; and FIG. 5 is a horizontal section taken on the line 5—5 of FIG. 2 looking in the direction of the arrows. This view shows the connection between the control cam of a record player such as that disclosed in my copending application, Ser. No. 477,171 above noted, and the tone arm raising and lowering means and means for producing angular movements of the tone arm involved in playing a record.

DESCRIPTION OF THE PREFERRED EMBODIMENT

Referring to FIG. 1, which shows a record player equipped with my present invention, the player has a frame 1 in which is mounted a horizontal base plate 2 with an ornamental trim panel 3 at the left side and a functional control panel 4 with control knobs thereon at the right side of FIG. 1. The base plate 2 supports a turntable 5 equipped with circularly corrugated mat portions 6 and 7 for supporting standard large size and standard small size records, respectively. A removable record holding and dropping spindle 8 is located in the center of the turntable. It may be replaced by an adapter or a centering spindle. Below the frame plate 2, a motor 9, shown in broken lines in FIG. 1, is mounted. It is connected by an elastic belt 10 through driving pulley 11 to a driving drum 12 attached to the lower side of the turntable. On the right side of FIG. 1 a tone arm base 13 is mounted on the main base plate 2. It provides a bearing on a vertical axis for a hollow vertical tone arm supporting shaft 14 (see FIGS. 2 and 3) which is mounted in a tubular bearing 15 which is integral with and dependent from the tone arm bearing body 13 (see FIGS. 2 and 3). The tone arm shaft 14 at its upper end carries a vertical pivot ring 16 through the intermediary of a head 17 which forms a vertical bearing collar for the said tone arm shaft 14 and its connection to the pivot ring 16. The pivot ring 16 and the cooperating horizontal pivoted tone arm supporting ring 19a constitute a pair of gimbal rings 18 through which the tone arm shaft 14 and the tubular tone arm 19 are hinged to each other at the upper end of the tone arm shaft 14 to provide angular motion of the tone arm in generally horizontal and vertical planes. The tone arm pivot ring 16 supports two manually adjustable spring biased controlling rings 20 and 21 for adjusting spring tensions imposed upon the tone arm 19 and its supporting pickup 22. The inner or rear end of the tone arm carries an adjustable counterbalancing weight 23 for counterbalancing the tone arm 19 and pickup 22, which pickup may be interchangeable with other forms of pickup. A rest post 24 which may be provided with a suitable lock holds the tone arm 19 when the latter is not in use.

The control panel 4 shown in plan view in FIG. 1 bears controls connected with the operation of the player in various modes. These are indicated on the lower part of the panel in FIG. 1 and are disclosed in my copending application Ser. No. 477,171.

A cueing control lever 25 has a horizontal bearing portion 25a, and the lever 25 projects through a slot in the face of the control panel 4 as shown in plan view in FIG. 1. The said cueing control lever 25 and its mounting and cooperation with the rocker plate 26 are shown in elevation on a larger scale in FIG. 3.

The cueing lever 25 is mounted to rock on a linear horizontal portion 25a which serves as a crank shaft.

The rocker plate 26, rocking on the depending fulcrum member 27, coordinates a number of actions or influences, the first of which is the upward thrust of the adjustable fulcrum washer 31 by spring 28. The spring 28 is a coil spring mounted on the stem of the adjusting screw 29 which has a hexagon head at its lower end, and the upper threaded end thereof is received in a threaded sleeve 30 integral with and depending from the inside of the top wall of the tone arm bearing body 13. The fulcrum 27, over which rocker plate 26 is pivoted, is rigid with the tone arm bearing body 13.

The knob 45 has a hollow stem splined on the upper reduced diameter end of the adjusting screw 29 with a forced fit whereby to turn the adjusting screw 29 on its threads in the depending internally threaded sleeve 30. Turning the knob 45 turns the bolt 29 on its threads 30 to increase or relax the pressure of spring 28 on the right hand side of rocker plate 26, as viewed in FIG. 3. Compressing spring 28 by turning knob 45 will tend to accelerate the lowering of plunger 42 and expedite the lowering of the tone arm 19. Backing off the spring pressure of spring 28 allows a slower rate of return of the needle into the groove.

The operation of raising the tone arm 19 and pickup 22 to take the needle out of the groove upon initiating a cueing operation involves swinging the cueing lever handle 34 forwardly and downwardly as viewed in FIG. 1, and to the left as viewed in FIG. 2. This causes the short arm 33 to depress the adjacent end of the rocker plate 26. This causes the rocker plate 26 to rock on the fulcrum formed by the projections 32 disposed diametrically on the washer 31. The outer end of the rocker plate 26 between the knife edges 44–49 (FIG. 3) is swung upwardly causing the vertical lifting plunger, or lift pin 42 to slide upwardly in a vertical cylinder 41 to engage and raise the tone arm supporting gimbal ring 19a. Cylinder 41 is mounted on tone arm base 13, in alignment with the downwardly facing annular wall of gimbal ring 19a. The lift pin moves in cylinder 41 at a rate controlled by the viscous silicone grease fillings in the rings 51. The silicone fillings in the rings 51 contacts the bare walls of cylinder 41 (FIG. 4) as well as the walls of the rings and, in effect, wets the same to the extent of requiring an internal movement of the substance of the rings to enable relative motion of the plunger and cylinder, thereby hydraulically controlling the rate of motion to a substantially uniform value for a wide range of forces, thereby controlling the rate of movement of the plunger 42 and the connected tone arm. The reversal or downward movement of the tone arm to put the needle back into the groove is similarly controlled by the downward (inward) motion of the plunger 42 when the cueing finger piece 34 is swung back and down.

The manually operable cam 33 is self-locking relative to the pivoted rocker plate in that the working surface of the inner looped end 33 presents so low an angle to the flat surface plate that the pressure of the plate 26 against the round ring-like end of the cueing lever 25 will not cause backward rotation of the cueing lever 25. In brief, the angle of incidence between the curved end 33 and the flat plate 26 is less than the angle whose tangent is the coefficient of friction between said engaging surfaces.

The initial movement of the cueing lever 25 positively moves the rocker plate 26. This initial movement of lever 25 does not compel immediate response of lifting the tone arm, first, because in the normal playing position of the parts the lift plunger 42 lies below and out of contact with the tone arm ring 19a, and the rocker plate is tilted up at its free end as shown in FIG. 3. With the parts in this position, the right-hand end of the rocker plate 26 is raised and is so held by rocker control spring 28 pressing the rocker plate 26 against the fulcrum 27. Preferably the cam 33 is self-locking with respect to the follower or rocker plate 26 so that a small positive pressure must be applied to the lever 25 in the reverse direction to release the rocker plate 26 from any tone arm lifted position.

A brake or holding pin 35 is guided at its lower end in the lug 36 which is integral with the tone arm bearing body 13, and at its upper end in a downwardly facing part of the tone arm bearing body 13, with a compression spring 38 on said pin 35 pressing down on said pin through a collar 37 fixed on the pin 35. The pin, at its lower end, bears against the friction plate 39 mounted on the inner end of the trip lever 40.

THE ROCKER PLATE 26

The adjustable upward pressure of the spring 28 upon the right hand side, with respect to the fulcrum 27, of the rocking plate 26 is exerted through a washer 31 on the upper end of the spring 28. The projections 32 formed on the lower side of the lever 26—one on each side of the screw 29 (FIG. 3)—serve as a fulcrum.

The right hand arm of the rocker lever 26, as viewed in FIG. 3, bears against the rounded terminal or cam portion 33 of the cueing lever 25. The cueing lever 25 extends diagonally upward to the right from the control panel 4 at the side of the tone arm bearing body 13 (FIG. 2). The exposed end of the cueing control lever bears a finger piece 34 in a convenient position to be grasped by the thumb and fingers of the operator. The outer end and finger piece of cueing lever 25 are extended over center with respect to the horizontal bearing part 25a and loop or cam portion 33 so that normally these parts place no burden on the rocker plate 26 and merely hold the cueing lever lightly to avoid lost motion.

The right hand of the rocker plate 26, as viewed in FIG. 3, controls a bearing pin 35 movable in a pair of vertical guides 36—36 rigid with the depending stem 15 of the tone arm bearing. The holding pin 35, for providing a breaking action on the tone arm, is vertically slidable, being guided at its lower end by the said holding pin guide 36 and guided at its upper end in a cylindrical hole formed in the body of the tone arm bearing body 13. The said holding pin 35 has a circular flange 37 overlying the fork 26a formed on the edge of the rocker plate 26 embracing the brake pin 35 below the fixed flange 37 whereby upon lowering of the right-hand end of the rocker plate, as viewed in FIG. 3, the pin 35 is moved downwardly by the spring 38 pressing against the flange 37 to move the holding pin 35 through the guide 36 downwardly to engage a friction plate such as the surface 39 on the top surface of the trip lever 40 adjacent the tone arm shaft 14.

The cam follower lever 52, as shown in FIG. 5, has a cam follower lever pin 53 in the cam track 54a of the cam gear 55 as disclosed in my copending application Ser. No. 477,171, and moves angularly in the plane of the paper in FIG. 5 and tilts in a vertical plane through the axis of the stationary pivot pin 56 to raise and lower the pin 48 connected to the left hand end of the rocker plate 26 by the knife edges 44–49 on coupling block 46, as shown in FIG. 3, for causing elevation of said plunger 48 and its connected lift pin 42 upon terminating the playing of a record. The trip lever 40, in a suitable automatic player, such as shown in my copending application Ser. No. 477,171, illustrates the manner in which the present invention may be embodied in an automatic player as well as in a manual player. It can be seen that the cueing lever 25 may be operated to tilt the rocker plate 26 and its associated parts independently of the automatic multiple record player parts, or a player embodying both automatic playing and the means of the present invention for cueing into the playing of any individual record.

A tension spring 54 strung between the rocker plate 26 and the brake pin 35 takes up possible lost motion and biases towards each other the rocker plate 26 and the pin 35 which is applied to the friction surface 39 carried by the trip lever 40. This avoids uncontrolled lost motion adjustments.

The operation of the cueing control of my invention is believed to be obvious from the foregoing detailed description of the structure and mode of operation. In general, the cueing lever 25 operates when the fingerpiece 34 is raised to raise the tone arm to lift the needle out of the groove of the record at a predetermined rate as determined by the movement of the plunger 42 in the cylinder 41 under the resistance to deformation of the annular bodies of silicone grease in the grooves 51, the plunger 42, cylinder 41 and the viscous silicone grease forming a hydraulic governor which controls the rate of movement of the tone arm.

The speed of that operation is adjustable by virtue of the adjustability of the pressure of the spring 28. This spring may be compressed against fulcrum 27 and cueing cam 33 which is stopped against retrograde motion by virtue of the stem engaging the end of the slot in the panel 4 through which it extends (FIG. 2).

The manual adjustment for this control is made by the knurled knob 45 which tensions or relaxes the spring compression by turning bolt 29 on the threads 30.

An adjustment for the height of lift of the tone arm may be made. This is employed to avoid the tone arm being lifted so high as to touch the bottom of a stack. By adjusting the height of the stop screw 50 for engaging the rocker plate 26, this upward motion is properly limited.

Adjustment of the projection of the lift pin 42 above the rocker plate may be made by turning the lift pin 42 on its threads 47 in the coupling block 46. For this purpose parallel flat spots 43 have been formed on the upper end below the rounded extremity for the application of a wrench to said flat spots 43.

I claim:

1. In a cueing control for lifting the tone arm of a record player, the combination of a horizontal base plate; a turntable journaled on a vertical axis on said base plate; a vertical tone arm supporting shaft; a tone arm base providing a bearing on a vertical axis for the tone arm supporting shaft, said tone arm base being mounted on said base plate; a pair of interconnected gimbal rings comprising a vertical first gimbal ring mounted at its periphery diametrically in alignment with and on the top of said vertical tone arm supporting shaft to provide angular motion of the tone arm in a generally horizontal plane, and a horizontal second gimbal ring pivotally mounted on two horizontally aligned pivots carried by the first gimbal ring to provide angular motion for the tone arm in a generally vertical plane; a tone arm comprising a tube and having a pickup mounted at one end, the other end of the arm being mounted on and extending diametrically through the walls of the horizontal gimbal ring and extending through the vertical gimbal ring; a hydraulic governor comprising a vertical cylinder mounted on said tone arm base and having a vertical lifting plunger movably disposed therein below and in alignment with the downwardly facing horizontal annular wall of the horizontal gimbal ring; said plunger being movable into engagement with said horizontal gimbal ring to lift said tone arm and said pickup at any angular position of said tone arm, said plunger having annular rings containing a viscous grease to hydraulically control the rate of motion of said plunger within said cylinder to regulate the lifting rate of said tone arm; a fulcrum member extending downwardly from the base plate; a rocker plate disposed beneath said base plate and in contact, intermediate its ends, with said fulcrum member, one end of said rocker plate being connected to said plunger; a manually operable, self-locking cam having an operating finger piece, said cam engaging the other end of said rocker plate; a manually adjustable spring for applying a controlled pressure to the rocker plate on the side of the fulcrum which is engageable by the manually operable cam to bias said rocker plate against said cam, said cam being movable in one direction to pivot said rocker plate to raise said plunger and movable in the other direction to pivot said rocker plate to lower said plunger, whereby said tone arm may be lifted and lowered; and brake means comprising a holding pin connected to and operable in response to actuation of said rocker plate to move vertically into engagement with a friction plate connected to said vertical tone arm shaft, said holding pin being so located as to contact said friction plate just before said plunger engages said horizontal gimbal ring so as to brake said vertical tone arm shaft to prevent motion of said tone arm in a horizontal direction.

2. The combination with claim 1 of a manually adjustable spring pressure adjusting knob for adjusting the pressure applied to the arm of the rocker plate by said manually adjustable spring.

* * * * *